United States Patent
Li et al.

(10) Patent No.: US 10,063,158 B1
(45) Date of Patent: Aug. 28, 2018

(54) GLOBALLY OPTIMAL CLOSE-LOOP CONTROLLING METHOD FOR TRIPLE-PHASE-SHIFT MODULATED DAB CONVERTER

(71) Applicant: Shanghai Jiao Tong University, Shanghai (CN)

(72) Inventors: Guojie Li, Shanghai (CN); Anping Tong, Shanghai (CN); Lijun Hang, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 15/925,685

(22) Filed: Mar. 19, 2018

(30) Foreign Application Priority Data

Aug. 3, 2017 (CN) .......................... 2017 1 0657027

(51) Int. Cl.
*H02M 3/335* (2006.01)
*H02M 3/158* (2006.01)

(52) U.S. Cl.
CPC .................. *H02M 3/33584* (2013.01); *H02M 2003/1586* (2013.01)

(58) Field of Classification Search
CPC ............. H02M 3/335; H02M 3/33515; H02M 3/33523; H02M 3/33569; H02M 3/33576; H02M 3/33592; H02M 3/33584; H02M 2003/1586
See application file for complete search history.

(56) References Cited

U.S. PATENT DOCUMENTS

2015/0365005 A1* 12/2015 Panov ............... H02M 3/33584 307/24
2018/0131287 A1* 5/2018 Cardu ..................... H02M 1/36

* cited by examiner

*Primary Examiner* — Kyle J Moody
(74) *Attorney, Agent, or Firm* — Mei & Mark LLP; Manni Li

(57) ABSTRACT

A globally optimal close-loop controlling method for a triple-phase-shift modulated DAB converter, which is based on three control variables of the internal phase shift ratio of the primary side full bridge, of the internal phase shift ratio of the secondary side full bridge, and of the phase shift ratio between the primary and the secondary side, of a DAB (dual active bridge-isolated bidirectional DC/DC dual active bridge-isolated bidirectional DC/DC) converter, enabling the DAB to automatically realize global optimal operation via close-loop controlling means under various conditions, thus raising DAB efficiency. The method of close-loop control with global optimization for the DAB has a good controlling performance.

2 Claims, 3 Drawing Sheets

GLOBALLY OPTIMAL CLOSE-LOOP CONTROLLING METHOD FOR TRIPLE-PHASE-SHIFT MODULATED DAB CONVERTER

CROSS-REFERENCE TO RELATED APPLICATION

The subject application claims priority on Chinese application no. 201710657027.1 filed on Aug. 3, 2017. The contents and subject matter of the Chinese priority application is incorporated herein by reference.

FIELD OF INVENTION

The present invention relates to DC/DC high frequency isolated transformation, particularly, a globally optimal close-loop controlling method for a triple-phase-shift modulated DAB converter.

BACKGROUND ART

As the electrical and electronic technology develops, high frequency isolated power transformation technique has been gradually more and more applied as an important moderate-speed versatile control means in the power grid. Phase shift modulation scheme (PSMS) based dual active bridge-isolated bidirectional DC/DC converter (DAB) has the characteristics of high power density, quick dynamic response, easily implementable soft switching, and bi-directional energy flow, thus, making it widely popular in the UPS, electric vehicle, and solid-state transformer, etc. Common means for controlling a DAB converter is via phase shift modulation, by means of generating a voltage square-wave with relative phase shift on the primary port and the secondary port of the high frequency converter, and by means of simultaneously controlling the relative phase shift between the primary and the secondary full-bridges driven by a switch obliquely orthogonal thereto to alter the duty ratio of the voltage square-wave, thus regulating the power flow via the converter. In accordance with the selected control variables, common modes for modulating a DAB converter include the single phase shift modulation (SPSM), dual phase shift modulation (DPSM), extended phase shift modulation (EPSM), and triple phase shift modulation (TPSM). Among these modes, the TPSM is the most general modulating mode, having three independent control variables, while the SPSM, DPSM, and EPSM may all be regarded as a simplified form of TPSM. Thus, the TPSM is the most versatile of them all, where rational constraint on the inter-relationship among the control variables may be exercised to decrease the effective value of the current passing through the converter to lower the current stress for the device during the transport of the same power by the DAB converter, therefore, the system efficiency may be elevated.

To increase the operational and transformational efficiency for the input and output power, realization of globally optimal operation is needed for the DAB. Further, how to realize the global optimization via close-loop control is the key to increase the operational performance of the DAB.

SUMMARY OF THE INVENTION

To solve the problem and increase the efficiency for the input and output power, the present invention provides a globally optimal close-loop controlling method for a triple-phase-shift modulated DAB converter. The method of the present invention realizes the globally optimal operation automatically by close-loop control, thus improving the operational performance of the DAB.

The technical solution of the present invention is as follows:

A globally optimal close-loop controlling method for a triple-phase-shift modulated DAB converter is provided with the DAB converter comprising a DC voltage source, a primary side single phase full bridge $H_1$, a secondary side single phase full bridge $H_2$, a high frequency isolated transformer, a high frequency inductor L, and a controller; 4 fully-controlled switches of the primary side single phase full bridge $H_1$ being $S_1 \sim S_4$, 4 fully-controlled switches of the secondary side single phase full bridge $H_2$ being $Q_1 \sim Q_4$; a positive pole of a DC bus of the primary side single phase full bridge being connected with a corresponding positive pole of the DC voltage source, a negative pole of the DC bus of the primary side single phase full bridge being connected with a corresponding negative pole of the DC voltage source, an AC side of the primary side single phase full bridge being connected with a primary side of the high frequency isolated transformer via the high frequency inductor L; a positive pole of a DC bus of the secondary side single phase full bridge being connected with a corresponding positive pole of a DC load, a negative pole of the DC bus of the secondary side single phase full bridge being connected with a corresponding negative pole of the DC load, an AC side of the secondary side single phase full bridge being connected with a secondary side of the high frequency isolated transformer, and a transformation ratio of the high frequency isolated transformer being n:1; an input port of a control signal of the switches $S_1 \sim S_4$ of the primary side single phase full bridge and an input port of a control signal of the switches $Q_1 \sim Q_4$ of the secondary side single phase full bridge being respectively connected with a corresponding output port of a switching signal of the controller; and the controller comprising a sampling unit, a PI controller, and a modulation unit, with the sampling unit having two signal input ports for respectively measuring an input voltage $V_{in}$ and an output voltage $V_{out}$ of the DAB for outputting an output x via the PI controller; an output port of an output switch of the modulation unit being connected with the input ports of the switches $S_1 \sim S_4$ and of the switches $Q_1 \sim Q_4$ of the primary side single phase full bridge and of the secondary side single phase full bridge respectively.

The method of the present invention comprises the following steps:

(1) respectively measuring the input voltage $V_{in}$ and the output voltage $V_{out}$ of the DAB, and in accordance with the transformation ratio n, computing a voltage transfer ratio of the controller according to expression (1):

$$M = \frac{n \times V_{out}}{V_{in}} \qquad (1)$$

wherein $V_{in}$ being the measured input voltage of the DAB, and $V_{out}$ being the measured output voltage of the DAB, n being the transformation ratio of the high frequency isolated transformer and being a parameter as well with an initial value thereof being pre-set;

(2) computing the output x of the PI controller according to expression (2):

$$x = k_p(V_{ref} - V_{out}) + k_i \int (V_{ref} - V_{out}) dt \qquad (2)$$

wherein $k_p$ and $k_i$ are proportional and integral parameters of the PI controller, respectively, and are pre-set as $0.1 \leq k_p \leq 10$, $0.001 \leq k_i \leq 1$; $V_{ref}$ is the setting value for DAB output voltage.

(3) computing three phase shift control variables for the DAB globally optimal close-loop control:

from a range of the x obtained from the expression (2), computing the control variables respectively for a primary side full bridge internal phase shift ratio $D_{1,opt}$, a secondary side full bridge internal phase shift ratio $D_{2,opt}$, and a phase shift ratio $D_{0,opt}$ between the primary and the secondary sides:

(i) if $x \geq 1$, then $$D_{0,opt} = f_3(x) = \frac{1}{2M}\left[(2x-3)\times\left(1 - \sqrt{1-M^2}\right) + M\right] \quad (3)$$

$$D_{1,opt} = 0$$

$$D_{2,opt} = 0$$

(ii) if $M \leq x \leq 1$, then $$D_{0,opt} = g_2(D_{1,opt}) = \quad (4)$$

$$\frac{D_{1,opt} - 1 + M + D_{1,opt}M}{2M} + \frac{\sqrt{(D_{1,opt}-1)^2 + M^2(D_{1,opt}^2 - 1)}}{2M}$$

$$D_{1,opt} = f_2(x) = 1 - x$$

$$D_{2,opt} = h_2(D_{1,opt}) = 0$$

(iii) if $0 \leq x \leq M$, then $$D_{1,opt} = f_1(x) = 1 - x \quad (5)$$

$$D_{0,opt} = g_1(D_{1,opt}) = \frac{(1-M)(1-D_{1,opt})}{M}$$

$$D_{2,opt} = h_1(D_{1,opt}) = 1 - \frac{(1-D_{1,opt})}{M}$$

wherein $D_{1,opt}$ represents the internal phase shift ratio of the $H_1$ for the port 1 of the DAB, $D_{2,opt}$ represents the internal phase shift ratio of the $H_2$ for the port 2 of the DAB, and $D_{0,opt}$ represents the phase shift ratio between the two ports respectively of the $H_1$ and $H_2$, with opt standing for optimization;

(4) constructing a sequentially inputted driving signal pulse in accordance with the primary side full bridge internal phase shift ratio $D_{1,opt}$, the secondary side full bridge internal phase shift ratio $D_{2,opt}$, and the phase shift ratio $D_{0,opt}$ between the primary and the secondary sides, for the controller to control operation of the primary side full bridge $H_1$ and the secondary side full bridge $H_2$ for modulation and for realization of the globally optimal close-loop control for the DAB converter as well for automatic realization of globally optimized operation of the DAB.

In comparison with the prior art, the present invention realizes globally optimal operation of the DAB via close-loop control and improves the operational performance for the DAB.

BRIEF DESCRIPTION OF THE DRAWINGS

FIG. 1(*b*) shows the portion having the controller of the DAB of the present invention.

DETAILED DESCRIPTION OF THE INVENTION AND EMBODIMENTS

The present invention is expounded in details with the figures and following embodiments, which do not serve to limit the scope of protection for the present invention. A person of skilled in the art may modify the embodiment as described without departing from the scope of the present invention.

Figure 1A:
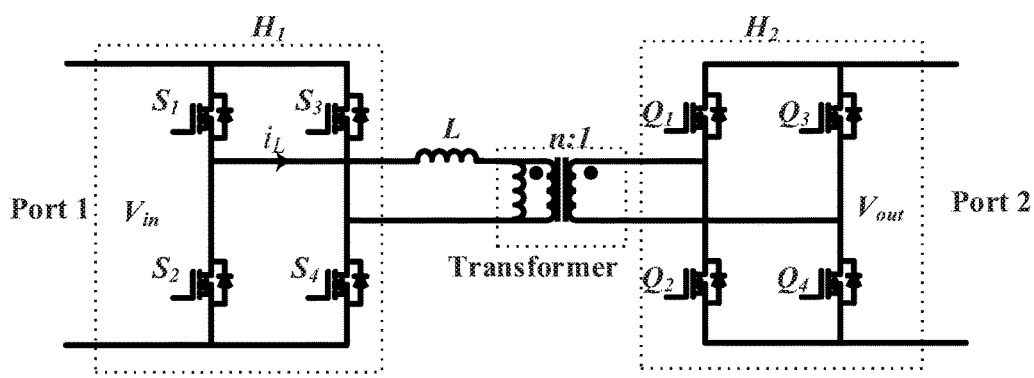
FIG. 1 is a schematic diagram showing the system composition of the DAB of the present invention, among which FIG. 1(*a*) shows portion having a primary side single phase full bridge $H_1$, a secondary side single phase full bridge $H_2$, a high frequency isolated transformer, and a high frequency inductor L of the DAB of the present invention.
Figure 1B:
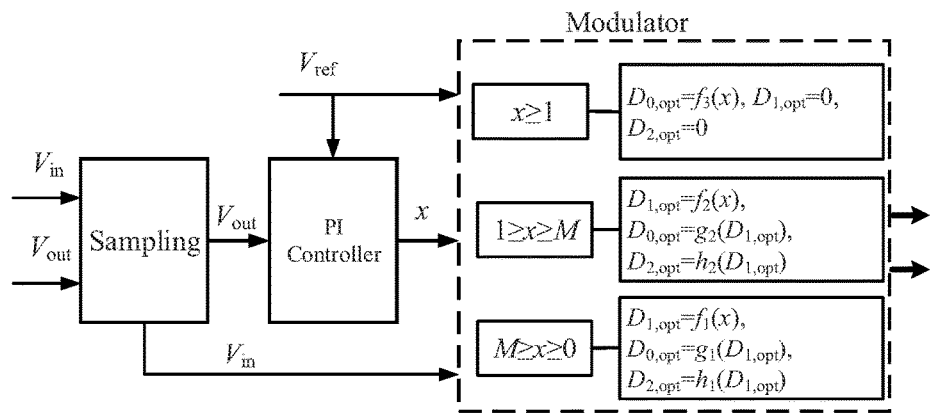

FIG. 1 is a schematic diagram for the system composition of the globally optimal close-loop controlling method for the triple-phase-shift modulated DAB converter of the present invention. As shown in FIGS. 1(*a*) and 1(*b*), the DAB converter comprises a DC voltage source, a primary side single phase full bridge $H_1$, a secondary side single phase full bridge $H_2$, a high frequency isolated transformer, a high frequency inductor L, and a controller; 4 fully-controlled switches of the primary side single phase full bridge $H_1$ being $S_1 \sim S_4$, 4 fully-controlled switches of the secondary side single phase full bridge $H_2$ being $Q_1 \sim Q_4$; a positive pole of a DC bus of the primary side single phase full bridge being connected with a corresponding positive pole of the DC voltage source, a negative pole of the DC bus of the primary side single phase full bridge being connected with a corresponding negative pole of the DC voltage source, an AC side of the primary side single phase full bridge being connected with a primary side of the high frequency isolated transformer via the high frequency inductor L; a positive pole of a DC bus of the secondary side single phase full bridge being connected with a corresponding positive pole of a DC load, a negative pole of the DC bus of the secondary side single phase full bridge being connected with a corresponding negative pole of the DC load, an AC side of the secondary side single phase full bridge being connected with a secondary side of the high frequency isolated transformer, and a transformation ratio of the high frequency isolated transformer being n:1; an input port of a control signal of the switches $S_1 \sim S_4$ of the primary side single phase full bridge and an input port of a control signal of the switches $Q_1 \sim Q_4$ of the secondary side single phase full bridge being respectively connected with a corresponding output port of a switching signal of the controller.

Referring to FIG. 1(*b*), the controller comprises a sampling unit, a PI controller, and a modulation unit, with the sampling unit having two signal input ports for respectively measuring an input voltage $V_{in}$ and an output voltage $V_{out}$ of the DAB for outputting an output x via the PI controller; an output port of an output switch of the modulation unit being connected with the input ports of the switches $S_1 \sim S_4$ and of the switches $Q_1 \sim Q_4$ of the primary side single phase full bridge and of the secondary side single phase full bridge respectively.

Figure 2:
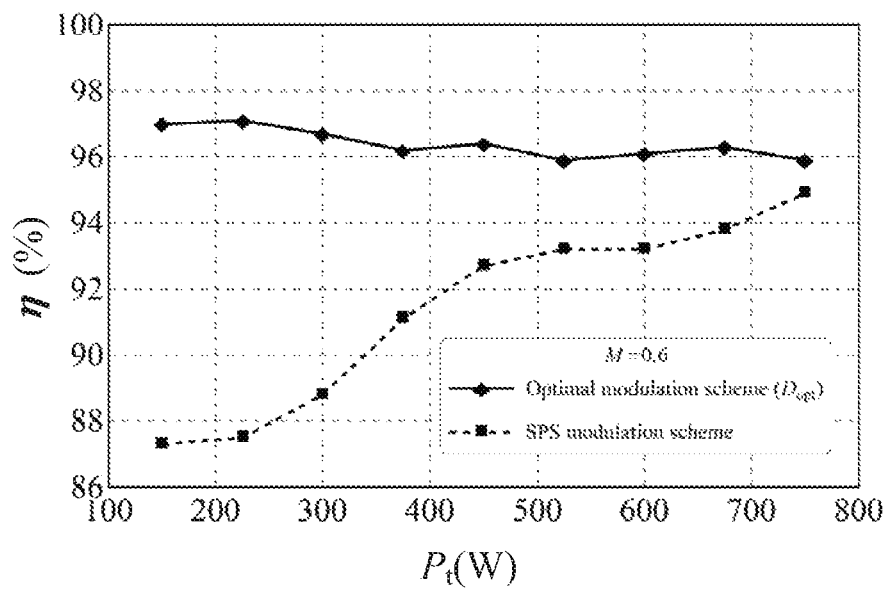
FIG. 2 is a diagram showing the operation efficiency at M=0.6 for the DAB of the present invention.
Figure 3:
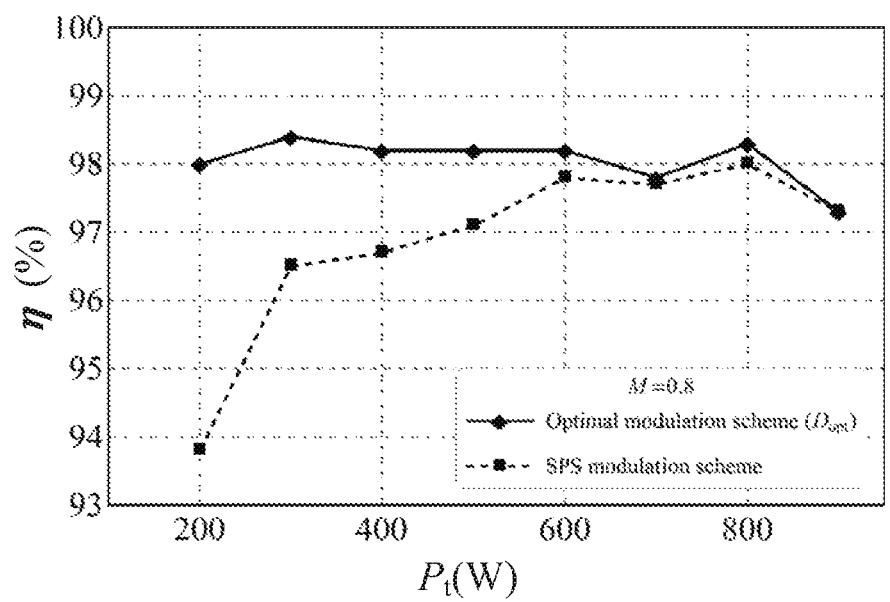
FIG. 3 is a diagram showing the operation efficiency at M=0.8 for the DAB of the present invention.
Figure 4:
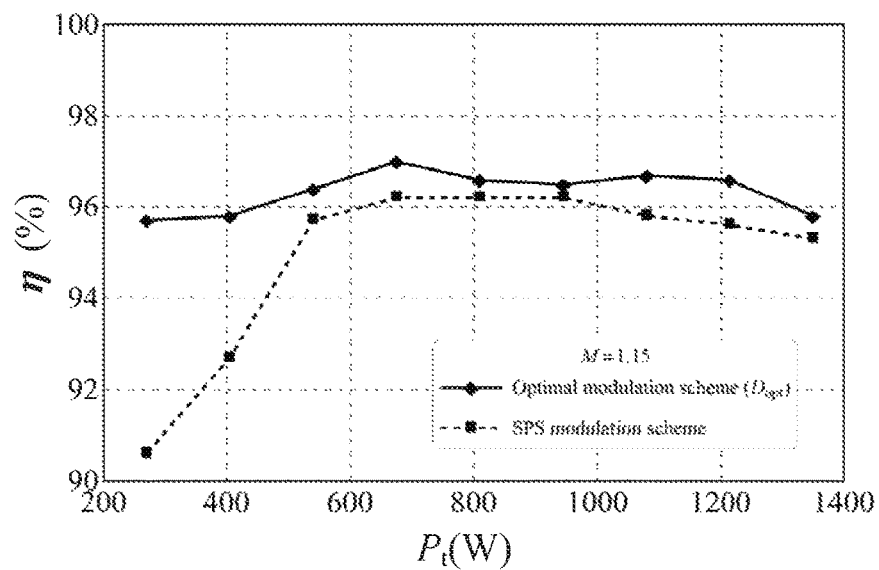
FIG. 4 is a diagram showing the operation efficiency at M=1.15 for the DAB of the present invention.

FIGS. 2, 3, and 4 compare operation efficiency of the present invention at various voltage modulation ratios of the DAB with the single phase shift modulation method of the prior art. As are shown in the figures, the curves $D_{opt}$ stand for the efficiency for the globally optimal method for the triple-phase-shift modulated DAB of the present invention, while the curves SPS stand for the single phase shift modulation method of the prior art, with those in FIG. 2, FIG. 3, and FIG. 4 standing for operation efficiency at the modulation ratios M=0.6, M=0.8, M=1.15, respectively, of the DAB of the present invention. All FIGS. 2 to 4 show that the DAB, for the various modulation ratios in the whole power range, is more efficient than the single phase shift modulation method, with the lowest efficiency at 96%, the highest efficiency surpassing 98%, thus substantially increasing efficiency for the DAB. As shown in the figures, the close-loop controlling method for the DAB of the present invention is capable to realize globally optimal operation for the DAB.

The globally optimal close-loop controlling method for the triple-phase-shift modulated DAB converter of the present invention specifically realized as follows:

Measure respectively the input voltage $V_{in}$ and the output voltage $V_{out}$ of the DAB, and the transformation ratio n of the high-frequency converter (the transformation ratio n of the converter is dependent on the specific device, and is inputted into the controller by the designer), with the controller computing the voltage transfer ratio M according to the expression (1); output the x from the difference between the output voltage reference value $V_{ref}$ and the measured output voltage $V_{out}$ of the DAB in accordance with the expression (2). Subsequently, output the obtained x and M to the modulation unit of the controller, compute the three phase-shift control variables $D_{1,opt}$, $D_{2,opt}$ and $D_{0,opt}$ in accordance with the expressions (3)~(5), and finally drive the power devices $S_1$~$S_4$, $Q_1$~$Q_4$ to control the operation of the DAB power devices and to realize optimal operation.

FIGS. 2 to 4 show that the operation efficiency for the DAB of the present invention under various voltage modulation ratios is higher than that for the single phase shift modulation method in the whole power range. As shown, the close-loop controlling method for the DAB of the present invention is capable of realizing globally optimal operation for the DAB.

We claim:

1. A globally optimal close-loop controlling method for a triple-phase-shift modulated DAB converter having a DC voltage source, a primary side single phase full bridge $H_1$ having four fully-controlled switches $S_1$ to $S_4$, a secondary side single phase full bridge $H_2$ having four fully-controlled switches $Q_1$ to $Q_4$, a high frequency isolated transformer having a transformation ratio n:1, a high frequency inductor L, and a controller comprising a sampling unit, a PI controller, and a modulation unit, an input port of a control signal of the switches $S_1$ to $S_4$ and an input port of a control signal of the switches $Q_1$ to $Q_4$ of being respectively connected with a corresponding output port of a switching signal of the controller, the sampling unit having two signal input ports for respectively measuring an input voltage $V_{in}$ and an output voltage $V_{out}$ of the DAB for outputting an output x via the PI controller; an output port of an output switch of the modulation unit being connected with the input ports of the switches $S_1$ to $S_4$ and of the switches $Q_1$ to $Q_4$ of the primary side single phase full bridge and of the secondary side single phase full bridge, respectively, comprising (1) respectively measuring $V_{in}$ and $V_{out}$ and computing a voltage transfer ratio M of the controller according to expression (1):

$$M = \frac{n \times V_{out}}{V_{in}} \qquad (2)$$

wherein $V_{in}$ is the input voltage of the DAB, and $V_{out}$ is the output voltage of the DAB, n is the transformation ratio of the high frequency isolated transformer;

(2) computing an output x of the PI controller according to expression (2):

$$x = k_p(V_{ref} - V_{out}) + k_i \int (V_{ref} - V_{out}) dt \qquad (2)$$

wherein $k_p$ and $k_i$ are respectively proportional and integral parameters of the PI controller and pre-set as $0.1 \le k_p \le 10$ and $0.001 \le k_i \le 1$; $V_{ref}$ is the setting value for DAB output voltage;

(3) computing three phase shift control variables for the DAB globally optimal close-loop control:

respectively computing the control variables for a primary side full bridge internal phase shift ratio $D_{1,opt}$, a secondary side full bridge internal phase shift ratio $D_{2,opt}$, and a phase shift ratio $D_{0,opt}$ between the primary and the secondary sides from a range of the x obtained from the expression (2), and (i) if $x \ge 1$, then $$D_{0,opt} = f_3(x) = \frac{1}{2M}\left[(2x-3) \times \left(1 - \sqrt{1-M^2}\right) + M\right] \qquad (3)$$

$$D_{1,opt} = 0$$

$$D_{2,opt} = 0$$

(ii) if $M \le x \le 1$, then $$D_{0,opt} = g_2(D_{1,opt}) = \qquad (4)$$

$$\frac{D_{1,opt} - 1 + M + D_{1,opt}M}{2M} + \frac{\sqrt{(D_{1,opt}-1)^2 + M^2(D_{1,opt}^2 - 1)}}{2M}$$

$$D_{1,opt} = f_2(x) = 1 - x$$

$$D_{2,opt} = h_2(D_{1,opt}) = 0$$

(iii) if $0 \le x \le M$, then $$D_{1,opt} = f_1(x) = 1 - x \qquad (5)$$

$$D_{0,opt} = g_1(D_{1,opt}) = \frac{(1-M)(1-D_{1,opt})}{M}$$

$$D_{2,opt} = h_1(D_{1,opt}) = 1 - \frac{(1-D_{1,opt})}{M}$$

wherein $D_{1,opt}$ is an internal phase shift ratio of the $H_1$ for a port 1 of the DAB, $D_{2,opt}$ is an internal phase shift ratio of the $H_2$ for a port 2 of the DAB, and $D_{0,opt}$ is a phase shift ratio between the two ports respectively of the $H_1$ and $H_2$, with opt standing for optimization; and (4) constructing a sequentially inputted driving signal pulse in accordance with the primary side full bridge internal phase shift ratio $D_{1,opt}$, the secondary side full bridge internal phase shift ratio $D_{2,opt}$, and the phase shift ratio $D_{0,opt}$ between the primary and the secondary sides, for the controller to control operation of the primary side full bridge $H_1$ and the secondary side full bridge $H_2$ for modulation and for realization of the globally optimal close-loop control for the DAB converter as well for automatic realization of globally optimized operation of the DAB.

2. The DAB converter system according to claim 1, comprising the DC voltage source,
the primary side single phase full bridge $H_1$ having the four fully-controlled switches being $S_1$, $S_2$, $S_3$, and $S_4$,
the secondary side single phase full bridge $H_2$ having the four fully-controlled switches $Q_1$, $Q_2$, $Q_3$, and $Q_4$,
the high frequency isolated transformer,
the high frequency inductor L, and the controller, the controller comprising
   the sampling unit,
   the PI controller, and
   the modulation unit,
wherein a positive pole of a DC bus of the primary side single phase full bridge is connected with a corresponding positive pole of the DC voltage source,
a negative pole of the DC bus of the primary side single phase full bridge is connected with a corresponding negative pole of the DC voltage source,
an AC side of the primary side single phase full bridge is connected with a primary side of the high frequency isolated transformer via the high frequency inductor L,
a positive pole of a DC bus of the secondary side single phase full bridge is connected with a corresponding positive pole of a DC load,
the negative pole of the DC bus of the secondary side single phase full bridge is connected with a corresponding negative pole of the DC load,
an AC side of the secondary side single phase full bridge is connected with a secondary side of the high frequency isolated transformer,
the transformation ratio of the high frequency isolated transformer is n:1,
the input port of the control signal of the switches $S_1$ to $S_4$ of the primary side single phase full bridge and the input port of a control signal of the switches $Q_1$ to $Q_4$ of the secondary side single phase full bridge are respectively connected with the corresponding output port of the switching signal of the controller,
the sampling unit has two signal input ports for respectively measuring the input voltage $V_{in}$ and the output voltage $V_{out}$ of the DAB for outputting the output x via the PI controller, and
the output port of the output switch of the modulation unit is connected with the input ports of the switches $S_1$ to $S_4$ and of the switches $Q_1$ to $Q_4$ of the primary side single phase full bridge and of the secondary side single phase full bridge, respectively.

\* \* \* \* \*